June 23, 1942.   L. P. WEENS   2,287,715
SHIELDED SPOON
Filed April 4, 1941

Lloyd P. Weens,
INVENTOR

BY Victor J. Evans & Co.
ATTORNEYS

WITNESS

Patented June 23, 1942

2,287,715

UNITED STATES PATENT OFFICE 2,287,715

SHIELDED SPOON

Lloyd P. Weens, Rockford, Ill.

Application April 4, 1941, Serial No. 386,937

5 Claims. (Cl. 30—326)

This invention relates to spoons, and its general object is to provide a spoon that is primarily designed for use when eating citrus fruits, such as a half of a grapefruit, in that the bowl of my spoon is shaped to facilitate penetrating the fruit and shielding means is associated with the handle, for disposal over the bowl, in the path of juice that may be ejected or squirted from the fruit when penetrating the same, preparatory to filling the bowl, therefore it will be seen that my spoon not only materially expedites the removal of the pulp and juice from the sections of the fruit, but overcomes embarrassment brought about by juice squirting in all directions, as well as eliminates juice stains on the table cloth and clothing.

A further object is to provide a spoon of the character set forth, that can be manipulated in an easy and expeditious manner, and the juice shield is not only transparent to facilitate the use of the spoon, but is foldable for disposal in compact form when not in use.

Another object is to provide a spoon that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which.

Figure 1:
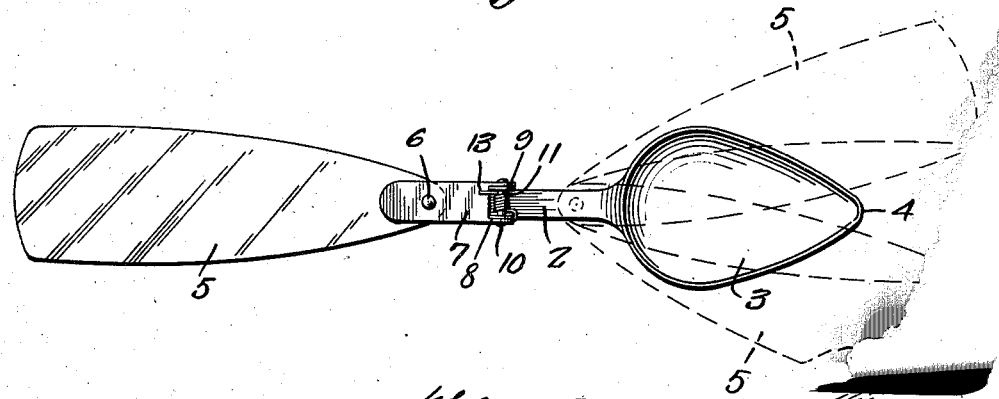
Figure 1 is a top plan view of my spoon, with the fan like juice shield in folded position in full lines and in open and operative position in dotted lines.

Referring to the drawing in detail, it will be noted that the handle 1 which is preferably flat as shown, is tapered outwardly toward its outer end from the shank 2 in the usual manner, and the shank not only increases in width toward its juncture with the bowl 3 to follow the curvature of the rear portion of the bowl, but also inclines upwardly therefrom, as shown in Figure 1. The bowl is elongated and provided with a relatively wide rear portion but gradually tapers inwardly therefrom to provide a substantially pointed forward end 4 which materially facilitates the penetrating action of the bowl within the fruit, as will be apparent.

While the shape of the bowl is of course important in view of the advantages derived therefrom, the most important feature of my spoon lies in the structure of the fan like juice shield and its connection with the shank, and the shield includes a plurality of identical shaped flat transparent elongated leaves 5, there being three leaves in the form shown, and they are reduced from their transverse center to their inner ends, while the remaining or rear portions of the leaves are substantially the same width to the outwardly curved outer ends thereof, as clearly shown in Figure 1.

Figure 2:
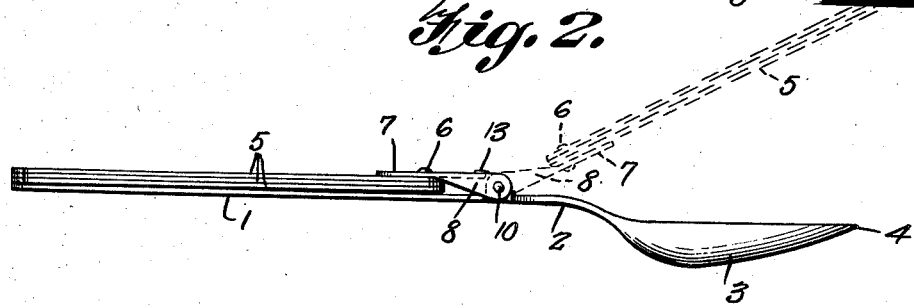
Figure 2 is a side elevation of the spoon, with the shield in its respective positions of Figure 1.
Figure 3:
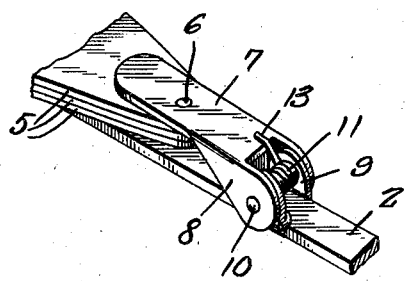
Figure 3 is an enlarged fragmentary perspective view illustrating the hinge for connecting the shield with the handle shank of the spoon.

The leaves each have an opening adjacent their inner ends for receiving suitable means such as a rivet 6 for securing the leaves in overlapped relation, to a hinge strip 7 for pivotal movement, so that the leaves can be spread in fan like formation, as best shown in dotted lines in Figure 1, or folded flush with each other in superimposed relation with respect to the handle, as shown in full lines in Figure 2.

The hinge strip 7 is formed with lateral ears 8 extending below and forwardly therefrom for disposal upon the outer sides of ears 9 that are formed on and rise from the side edges of the shank 2, and a hinge or pivot pin 10 extends through the ears 8 and 9 for pivotally connecting the hinge strip 7 to the shank, for movement of the leaves to their respective positions, as shown.

A coil spring 11 is sleeved on the hinge pin 10 and has one end terminating into a finger 12 engaged with the shank and turned about the forward edge of one of the ears 9 and the opposite end of the spring terminates into a finger 13 that bears against the top of the hinge strip 7 to urge and hold the leaves to and in their normal position.

From the above description and the disclosure in the drawing, it is believed that the use of my spoon will be obvious, but it might be mentioned that the leaves 5 are first spread to open position for disposal in fan like formation and are thence raised against the action of the spring. The handle is gripped in the usual manner, with the thumb of the user disposed between the leaves and the shank, so that the movement of the shield can be readily controlled. The shield is then moved forwardly for disposal in overlying relation with respect to the bowl, as shown in dotted lines in Figure 2, so as to be arranged in the path of the juice that may squirt from the fruit as the bowl penetrates the same. After the bowl has become filled with fruit, and removed therefrom, the thumb pressure is released, preferably as the spoon is brought toward the mouth of the user, thereby permitting the spring to move the shield to a position to allow ready access to the bowl and the fruit therein.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A spoon for use in eating citrus fruits, comprising a handled bowl, a foldable fan like shield hingedly associated with the handle for hinged movement to a normal position in overlapped contacting relation with the handle or to an operative position in overlying spaced relation with the bowl, and means for urging and holding the shield to and in its normal position.

2. A spoon for use in eating citrus fruits, comprising a handled bowl, a shield hingedly associated with the handle for movement to a normal position in overlapped relation with the handle or to an operative position in overlying spaced relation with the bowl, said shield being made up of a plurality of leaves pivotally connected together for disposal in flush superimposed relation to each other or in fan like formation, and means for urging and holding the shield to and in its normal position.

3. A spoon for use in eating citrus fruits, comprising a handled bowl having a pointed outer end, a hinge strip, ears formed on the hinge strip, a hinge pin associated with the handle and having the ears connected thereto, a shield carried by the hinge strip for movement to a normal position in overlapped relation with the handle or to an operative position in overlying spaced relation with the bowl, and a spring sleeved on the pin and associated with the hinge strip to urge and hold the shield to and in its normal position.

4. A spoon for use in eating citrus fruits, comprising a handled bowl having a pointed outer end, a hinge strip, ears formed on the hinge strip and extending from one end thereof, a hinge pin associated with the handle and having the ears connected thereto, a shield made up of a plurality of elongated transparent leaves pivotally connected to the hinge strip for disposal in flush superimposed relation to each other or in fan like formation, said shield being movable by the hinge strip to a normal position in overlapped relation with the handle and to an operative position in overlying spaced relation with the bowl, and a coil spring sleeved on the pin for urging and holding the shield to and in its normal position.

5. A spoon for use in eating citrus fruits, comprising a handle including a shank, an elongated bowl terminating into a pointed outer end and having the shank formed on the inner end thereof, ears formed on the side edges of the shank and rising therefrom in parallelism with each other, a hinge strip overlying the shank, ears formed on one end of the hinge strip and paralleling the first ears, a hinge pin bridging the first ears and extending therethrough and the ears of the strip being connected to the ends of the pin, a shield carried by the strip for movement to a normal position in overlapped relation with the handle or to an operative position in overlying spaced relation with the bowl, a coil spring sleeved on the pin, a finger at one end of the spring and bearing against the shank, a finger at the opposite end of the spring and bearing against the hinge strip for urging and holding the shield to and in its normal position, and said shield being made up of a plurality of elongated flat tapered transparent leaves pivotally connected to the hinge strip for disposal in flush superimposed relation to each other or in fan like formation.

LLOYD P. WEENS.